(12) United States Patent
Joshi et al.

(10) Patent No.: US 10,740,209 B2
(45) Date of Patent: Aug. 11, 2020

(54) TRACKING MISSING DATA USING PROVENANCE TRACES AND DATA SIMULATION

(71) Applicant: International Business Machines Corporation, Armonk, NY (US)

(72) Inventors: Salil Joshi, Bangalore (IN); Hima Prasad Karanam, Bangalore (IN); Manish Kesarwani, Bangalore (IN); Sameep Mehta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/105,454

(22) Filed: Aug. 20, 2018

(65) Prior Publication Data
US 2020/0057708 A1 Feb. 20, 2020

(51) Int. Cl.
*G06F 9/44* (2018.01)
*G06F 11/34* (2006.01)
(Continued)

(52) U.S. Cl.
CPC ........ *G06F 11/3461* (2013.01); *G06N 7/005* (2013.01); *G06N 20/00* (2019.01)

(58) Field of Classification Search
CPC ..... G06F 11/3461; G06N 20/00; G06N 7/005
(Continued)

(56) References Cited

U.S. PATENT DOCUMENTS

| | | | |
|---|---|---|---|
| 7,480,640 B1 * | 1/2009 | Elad | G06Q 10/10 |
| | | | 706/14 |
| 7,873,589 B2 * | 1/2011 | Shiffman | G06N 5/025 |
| | | | 706/47 |

(Continued)

OTHER PUBLICATIONS

Renan Souza,Leonardo Azevedo,V´itor Lourenc,Elton Soares,Raphael Thiago,Rafael Brand˜ao,Daniel Civitarese,Emilio Vital Brazil ,Marcio Moreno,Patrick Valduriez,Marta Mattoso,Renato Cerqueira,Marco A. S. Netto: "Provenance Data in the Machine Learning Lifecycle in Computational Science and Engineering"—ACM/IEEE '19.*

(Continued)

*Primary Examiner* — Francisco J Aponte
(74) *Attorney, Agent, or Firm* — Ryan, Mason & Lewis, LLP

(57) ABSTRACT

Methods, systems, and computer program products for tracking missing data using provenance traces and data simulation are provided herein. A computer-implemented method includes generating, for each of multiple stages in a data curation sequence, a machine learning model of the data curation sequence, wherein the model is based on historical input records within the data curation sequence, historical output records within the data curation sequence, and provenance data within the data curation sequence; creating a simulated output record based on a detected anomaly corresponding to the data curation sequence; predicting the content of absent input records that precede the simulated output record in the data curation sequence and provenance data corresponding to the simulated output record; and outputting, to a user, in response to a query pertaining to the (Continued)

detected anomaly, the predicted input records and information relating the predicted input records to the detected anomaly.

18 Claims, 6 Drawing Sheets

(51) Int. Cl.
  *G06N 7/00* (2006.01)
  *G06N 20/00* (2019.01)
(58) Field of Classification Search
  USPC .................................................. 717/128, 135
  See application file for complete search history.

(56) References Cited

U.S. PATENT DOCUMENTS

| | | | | |
|---|---|---|---|---|
| 8,600,683 | B2* | 12/2013 | George | G01N 35/00603 702/19 |
| 8,959,577 | B2* | 2/2015 | Epstein | G06F 21/604 726/1 |
| 9,031,926 | B2* | 5/2015 | Milward | G06F 17/277 707/706 |
| 9,558,321 | B2* | 1/2017 | Tijanic | G06F 8/34 |
| 10,007,884 | B2* | 6/2018 | Alboszta | G06N 10/00 |
| 10,282,790 | B1* | 5/2019 | Kolbrener | G06Q 40/12 |
| 10,339,575 | B2* | 7/2019 | Agrawal | G06Q 30/0283 |
| 2014/0162257 | A1* | 6/2014 | George | G01N 35/00603 435/6.11 |
| 2014/0165203 | A1* | 6/2014 | Friedrichs | G06F 21/564 726/24 |
| 2014/0223000 | A1* | 8/2014 | Castro | H04L 43/08 709/224 |
| 2014/0250145 | A1* | 9/2014 | Jones | G06Q 10/101 707/769 |
| 2015/0205831 | A1 | 7/2015 | Rundle et al. | |
| 2015/0254330 | A1* | 9/2015 | Chan | G06F 16/285 707/613 |
| 2016/0048542 | A1* | 2/2016 | Gluzman Peregrine | G06F 16/215 707/692 |
| 2016/0253340 | A1* | 9/2016 | Barth | G06F 16/148 707/756 |
| 2016/0357957 | A1* | 12/2016 | Deen | G06N 99/00 |
| 2017/0017683 | A1* | 1/2017 | Fourny | G06F 16/22 |
| 2018/0052878 | A1* | 2/2018 | Seetharaman | G06Q 10/0637 |
| 2018/0082183 | A1* | 3/2018 | Hertz | G06Q 10/10 |
| 2018/0144067 | A1* | 5/2018 | Chatelain | G06F 7/02 |
| 2018/0341667 | A1* | 11/2018 | Gluzman Peregrine | G06F 16/215 |
| 2018/0367549 | A1* | 12/2018 | Jang | H04L 63/1416 |
| 2019/0005395 | A1* | 1/2019 | Dutkowski | G06N 5/022 |
| 2019/0050479 | A1* | 2/2019 | Scriffignano | G06F 16/907 |
| 2019/0121979 | A1* | 4/2019 | Chari | G06N 20/00 |
| 2019/0164092 | A1* | 5/2019 | Argyros | G06N 20/00 |
| 2019/0205794 | A1* | 7/2019 | Hsu | G06N 5/022 |
| 2019/0236175 | A1* | 8/2019 | Cham | G06F 11/3006 |
| 2019/0279261 | A1* | 9/2019 | Pappas | G06Q 30/0283 |

OTHER PUBLICATIONS

Fuzel Jamil, Abid Khan, Adeel Anjum, Mansoor Ahmed, Farhana Jabeen, Nadeem Javaid: "Secure provenance using an authenticated data structure approach"—computers & s e c u r i t y 73 ( 2018 ) 34-56.*

Matthias Boehm et al.: "SystemDS: A Declarative Machine Learning System for the End-to-End Data Science Lifecycle"; CIDR 2020. 10th Annual Conference on Innovative Data Systems Research (CIDR '20) Jan. 12-15, 2020, Amsterdam, Netherlands.*

Salmin Sultana: "Digital provenance—models, systems, and applications"; Theses and Dissertations—Purdue University, 2014.*

Praneet Mysore: "Analysis of Data Provenance Across Various Applications"; Department of Computer Science California State University, Sacramento; 2013.*

Xin Li et al. :"Inferring User Actions from Provenance Logs"; 2015 IEEE Trustcom/BigDataSE/ISPA. Cyber Security Lab, Department of Computer Science University of Waikato Hamilton, New Zealand.*

Yanchao Wang et al.: "PDB Data Curation"; Proceedings of the 28th IEEE EMBS Annual International Conference New York City, USA, Aug. 30-Sep. 3, 2006.*

Sansrimahachai, W., Tracing Fine-Grained Provenance in Stream Processing Systems using a Reverse Mapping Method, University of Southampton, Faculty of Physical and Applied Sciences, Doctoral Thesis, Apr. 17, 2017.

Chiticariu et al., DB Notes: A Post-It System for Relational Databases based on Provenance, Proceedings of the 2005 ACM SIGMOD International Conference on Management of Data, pp. 942-944.

Chapman et al., "Why not?." Proceedings of the 2009 ACM SIGMOD International Conference on Management of data. ACM, 2009.

Herschel et al., "The Nautilus Analyzer: understanding and debugging data transformations." Proceedings of the 21st ACM international conference on Information and knowledge management. ACM, 2012.

Roy et al., "Provenance-based dictionary refinement in information extraction." Proceedings of the 2013 ACM SIGMOD International Conference on Management of Data. ACM, 2013.

* cited by examiner

TRACKING MISSING DATA USING PROVENANCE TRACES AND DATA SIMULATION

FIELD

The present application generally relates to information technology, and, more particularly, to data management.

BACKGROUND

Provenance can be used to tracks data flows in an information processing system. Given an output record, for example, provenance can be used to trace the output record back to the original input record. However, if certain output records are missing, challenges exist in attempting to identify where and/or when the issue exists within the information processing system with respect to that record.

SUMMARY

In one embodiment of the present invention, techniques for tracking missing data using provenance traces and data simulation are provided. An exemplary computer-implemented method can include generating, for each of multiple stages in a data curation sequence, a machine learning model of the data curation sequence, thereby updating the model after each subsequent stage, wherein the model is based at least in part on (i) one or more historical input records within the data curation sequence, (ii) one or more historical output records within the data curation sequence, and (iii) one or more items of provenance data within the data curation sequence. Such a method can also include creating a simulated output record based at least in part on a detected anomaly corresponding to the data curation sequence, and predicting (i) the content of one or more absent input records that precede the simulated output record in the data curation sequence and (ii) one or more items of provenance data corresponding to the simulated output record, wherein the predicting comprises applying the machine learning model to the simulated output record. Further, such a method includes outputting, to at least one user, in response to a query pertaining to the detected anomaly, (i) the content of the one or more predicted input records and (ii) at least one item of information relating the content of the one or more predicted input records to the detected anomaly.

In another embodiment of the invention, an exemplary computer-implemented method can include generating, for each of multiple stages in a data curation sequence, a machine learning model of the data curation sequence, wherein the model is based at least in part on (i) historical input records preceding the stage in question, (ii) historical output records subsequent to the stage in question, and (iii) one or more items of provenance data pertaining to the stage in question. Such a method can additionally include calculating a confidence value for each field within the one or more predicted input records, repeating the predicting for (i) one or more additional sets of input records and (ii) one or more additional corresponding sets of provenance data, and outputting, to at least one user, in response to a query pertaining to the detected anomaly, (i) the content of all of the predicted input records, (ii) the calculated confidence values, and (iii) at least one item of information relating the predicted input records to the detected anomaly.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes tracking missing data using provenance traces and data simulation. At least one embodiment of the invention includes tracing back to a failure spot (such as a data leak, for example) in a system by using provenance traces and/or provenance data. Such an embodiment can include creating a stage-wise model of a curation flow in an output-to-input direction to detect one or more failure spots, and utilizing the stage-wise modelling of the data curation flow to recreate a set of required input data.

As used herein, provenance refers to source documentation, along with the location within the documentation (record), from where an output is derived from a given module. For example, if there are n modules in a data curation flow, each module will provide a location, which is referred to herein as a span, in a document context (for example, from character number x to character number y in the document) along with rules within modules that operated on the record. Full provenance for a record can include multiple module provenances pertaining to where that record passes through, with the span markings that get provided by each module.

Figure 2:
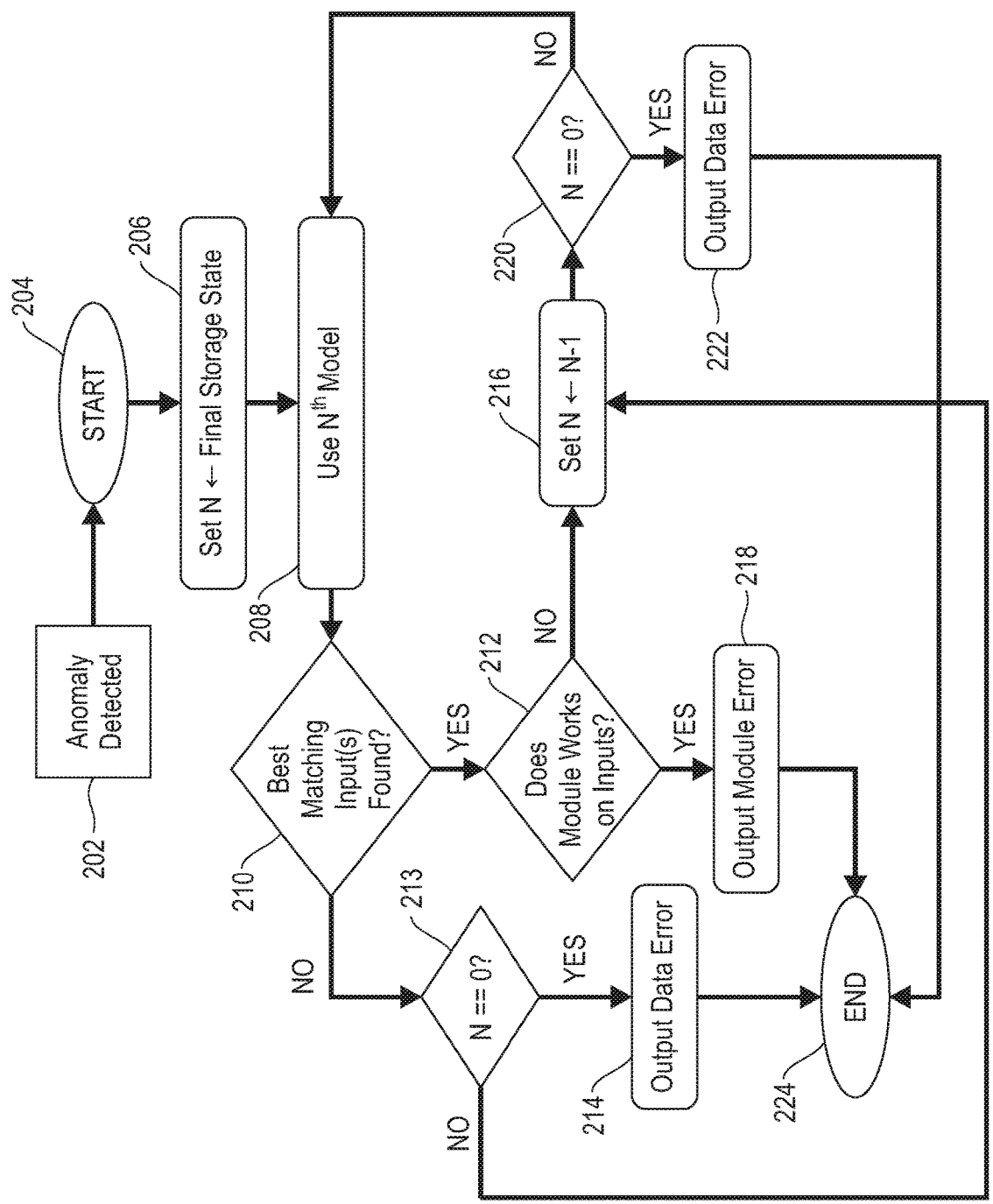
FIG. 2 is a flow diagram illustrating techniques according to an embodiment of the invention.

Additionally, at least one embodiment of the invention includes generating a model that simulates input data along with provenance (for example, span-level field details), given simulated output tuples. As used herein a simulated output tuple refers to a record that looks similar to any of the existing records in the final output and is missing in them. For example, if a record is expected to say that Person X works for Organization Y, and that record is missing, then a tuple can be created with name X and organization Y, and pass it as input to the system. Further, using the generated model, such an embodiment can also include identifying one or more failure spots in one or more modules of a given system, as well as identifying relevant input data records for a curation flow. As further detailed herein, FIG. 2 illustrates the process for identifying problematic records or modules. When a simulated output record is sent through the system, at each stage, the simulated output record considers a closest matching record and tries to see if the expected output is coming from the subsequent module based on the model output at each stage. If at any stage it is determined that the required input record and the simulated output record produces the correct output at that module level, then it can be declared that error is there in the modules subsequent thereto. If this process continues and no matching input records are found, it can be declared that there is no corresponding input record in the input data used.

One or more embodiments of the invention can additionally include stage-wise modeling of the curation flow for recreating and/or simulating only the relevant input data. Because a problem record-simulated output tuple is present, such an embodiment includes only generating the required input data that might have produced this record. This, in turn, can be used to compare against actual input records at that stage to identify the problem record/module.

As further detailed herein, at least one embodiment of the invention includes implementing a model that learns correspondences between output fields (such as, for example, FirstName) and character level spans (such as, for example, 7-11 for hypertext markup language (HTML)) recorded by a provenance object. Such learning can be carried out over all input documents and corresponding output records within the system (that is, all documents for which the system produced an expected outcome) to train one or more parameters of the model. Such parameters can include the span that needs to be predicted in the input records, given an output record. Other such parameters can include rules within the module that might act on the input record, and/or the characteristics of the input records that need to be produced for the given module, etc.

A trained model, in one or more embodiments of the invention, can answer queries for a potential range of characters in which a field is expected (for example, Range (FirstName)=[5, 35], Range(Email)=[15, 55], etc.). These example numerical ranges represent span, which defines from which character position to which character position a given attribute occurs in the input record/document. Here, for example, Range(FirstName)=[5, 35] indicates that the first name attribute occurs from character position 5 to character position 35 in the given input record/document.

In at least one embodiment of the invention, the implemented model operates in the opposite direction (that is, output-to-input) from that of the provenance objects (which operates input-to-output). Also, statistical behavior can be added to the model to incorporate a confidence value for each field (for example, Range(FirstName)=[5, 35, 99%]). In at least one embodiment of the invention, a machine learning model can produce confidence values corresponding to parameters or document predictions, and such confidence values can then be used by the system to identify an appropriate input record/document.

Further, in one or more embodiments of the invention, one or more machine learning (ML) models, such as, for example, conditional random fields (CRFs), can be used to learn one or more model parameters. By way of illustration, CRF factorization can handle cases for {n documents→1 output record}, or {1 document→m output records}.

Additionally, in at least one embodiment of the invention, a trained model can be used along with an output record to simulate a document template (for example, in the form of a search query over an input document collection). By way merely of example, assume an output record of: {FirstName: UserA, Org: EnterpriseA, Email: UserA@EnterpriseA.com, social media identifier: usera}. Additionally, assume a query template (model input) of: {UserA~Range(FirstName) && EnterpriseA~Range(Org) && UserA@EnterpriseA.com~Range(Email) && . . . }.

Accordingly, in such an example, a simulated document (model output) can include the following: {UserA~[5, 35] && EnterpriseA~[150, 180] && UserA@EnterpriseA.com~[15, 55]}. The query can then fetch one or more matching documents along with confidence values and/or information detailing the extent of matching. For example, such corresponding might include the following: {b.html: 99% match, p.html: 94% match . . . }. As detailed herein, input records can be documents or records with attribute values. The above example refers to some HTML documents from which the final output is extracted and curated.

Figure 1:
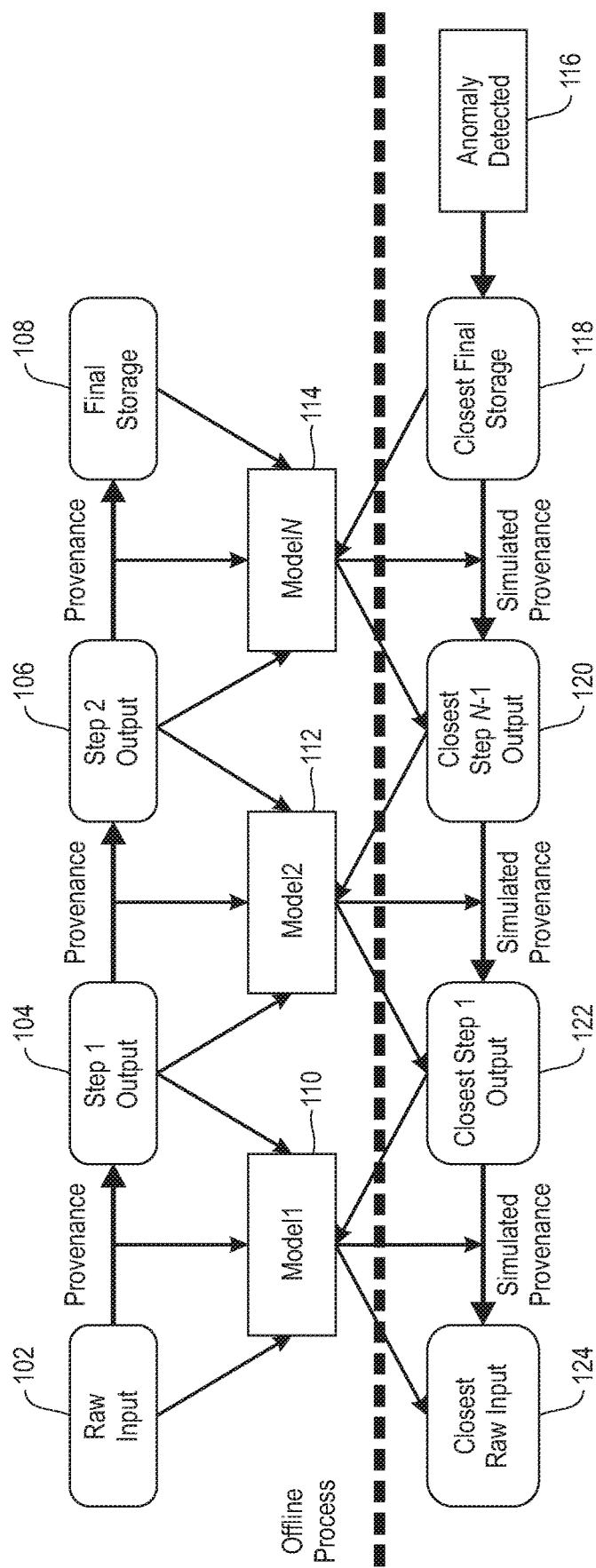
FIG. 1 is a diagram illustrating system architecture, according to an exemplary embodiment of the invention.

FIG. 1 is a diagram illustrating system architecture, according to an embodiment of the invention. By way of illustration, FIG. 1 depicts an offline process that includes obtaining raw input 102 (including, for example, historical data) and providing provenance data therefrom to a step 1 output 104 (which includes span-level information for step 1 of the given data curation sequence in question). The steps in FIG. 1 (Step 1, Step 2) refer to the different stages in the curation flow. Each step can be mapped to a module in the curation flow. Typically, a data curation flow includes multiple stages in which data passes through, and each stage/step can be represented as a module/step. Additionally, the raw input 102, as well as the provenance data derived therefrom, is provided to a first model (Model1) 110.

Further, the step 1 output 104 provides provenance data to both a step 2 output 106 (that is, span-level information for step 2 of the given data curation sequence in question) and a second model (Model2) 112. The step 1 output 104 also provides input directly to Model2 112, as illustrated in FIG. 1. Similarly, the step 2 output 106 provides provenance data to both a final storage component 108 and an nth model (ModelN) 114. The final storage component 108 can refer to the knowledgebase or database that is populated by the curation flow. The final storage component 108 can include a set of records in a document or stored in a data management system. The step 2 output 106 also provides input directly to ModelN 114, as illustrated in FIG. 1.

Accordingly, the offline process depicted in FIG. 1 includes implementing a model to capture {input document (s), span-level provenance data, output record(s)} for each stage/step of the data curation pipeline. The model can capture features at span-level to map output record elements with specific corresponding sections within an input document. The specific corresponding sections mapping is carried out by the machine learning model that is trained using a verified curation flow and provenance output for that flow at each stage. In such a model, it can be learned, for a given input record, what span ranges are possible for each attribute in the preceding record/document. By way of illustration, such a machine learning model effectively carries out a reverse process of data curation at each stage, whereby the model takes a simulated output record and produce possible documents and/or document features.

As also illustrated in FIG. 1, a runtime process is carried out in response to a detected anomaly 116, wherein the runtime process includes input in the form of a system output (either real or simulated) 118 that is closest to the final storage. This system output 118 can provide, as depicted in FIG. 1, input to ModelN 114 in the form of a predicted input document based on the simulated output records via model N. This, in turn, can be used as a simulated output for model N−1 to predict the possible input to model N−1, and so on.

Additionally, at least one embodiment of the invention includes generating simulated provenance data based at least in part on this system output 118 and inputs from ModelN 114. Simulated provenance data can be produced by the machine learning model based on its training. For example, such data can be learned a priori using gold standard input data from the curation flow for each step/module in the flow. Also, this simulated provenance data, along with input from ModelN 114, are used to generate output 120, which represents an output that is closest to step N−1 output in the data curation sequence.

Input from output 120 is provided to Model2 112, and simulated provenance data is derived from output 120 as well as input from Model2 112. This simulated provenance data, along with input from Model2 112, are used to generate output 122, which represents an output that is closest to the step 1 output 104 in the data curation sequence. As also depicted in FIG. 1, input from output 122 is provided to Model1 110, and simulated provenance data are derived from output 122 as well as input from Model1 110. This simulated provenance data, along with input from Model1 110, are used to generate output 124, which represents an output that is closest to the raw input 102 in the data curation sequence.

Accordingly, for each step/stage of the system/data curation sequence, a simulated input data template (created using span-level information) and a list of matching real input documents are generated, along with corresponding confidence scores, and used to trace a data curation sequence back in connection with a detected anomaly or failure. At each level, the machine learning model can produce some characteristic of the document or the document itself. If the machine learning model generates characteristics, then a data template can be used to produce the data based on the characteristics predicted by the model. Additionally, the machine learning model can be built to produce this simulated document directly as well.

FIG. 2 is a flow diagram illustrating techniques according to an embodiment of the invention. Step 204 includes starting the process in response to a detected anomaly 202. Step 206 includes setting the final storage state (in a given data curation flow) to N, and step 208 includes using the Nth model. Step 210 includes determining whether the best matching input(s) is found. Given a simulated input record generated from the machine learning model, at least one embodiment of the invention can include using the actual input records coming into that module from the original flow to identify the best possible match therein that possibly has details required to populate a detected anomaly in question. If no (that is, the best matching input is not found), and the module N is equal to 0 (as determined in step 213), then an output data error is generated in step 214, and the process ends via step 224. Else, N is set to N−1 in step 216, and the process is continued as further detailed below.

If yes (that is, the best matching input is found), then step 212 includes determining whether a given module works on the found input(s). To reiterate, a module or a step is referred to herein as a stage in a data curation flow that performs a particular job. A module can, by way merely of example, identify names from a given input document, identify an address in a given document, etc. Referring again to step 212, if yes (that is, the module works on the found input(s)), an output module error is generated, suggesting (in step 218) that the error is present in one of the subsequent modules that follow it in the flow, and the process ends via step 224. If no (that is, the module does not work on the found input(s)), then step 216 includes setting N to N−1, and step 220 includes determining whether N equals 0. If no (that is, N does not equal 0, then the process returns to step 208. If yes (that is, N equals 0), then an output data error is generated in step 222, and the process ends via step 224.

Figure 3:
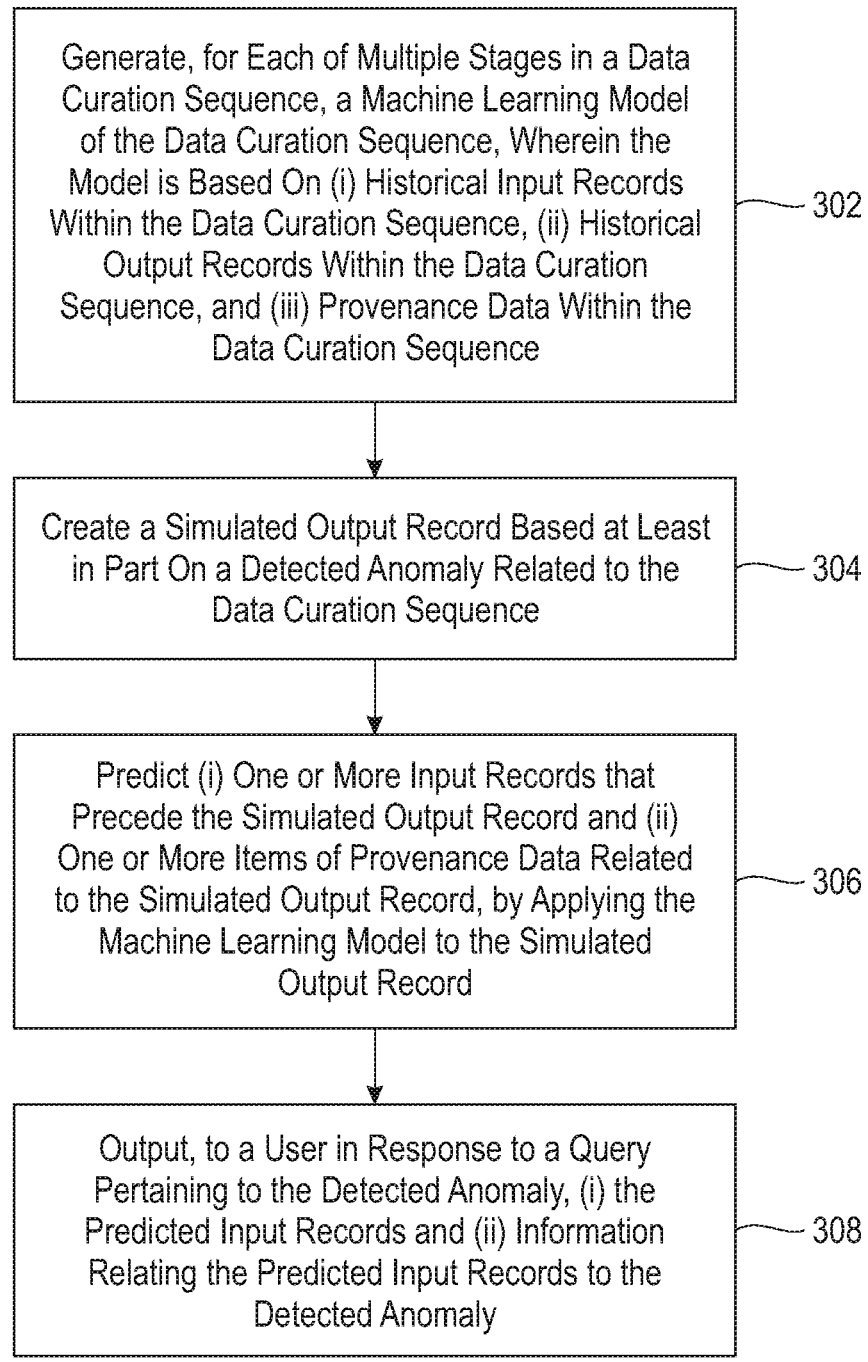
FIG. 3 is a flow diagram illustrating techniques according to an embodiment of the invention.

FIG. 3 is a flow diagram illustrating techniques according to an embodiment of the present invention. Step 302 includes generating, for each of multiple stages in a data curation sequence, a machine learning model of the data curation sequence, thereby updating the model after each subsequent stage, wherein the model is based at least in part on (i) one or more historical input records within the data curation sequence, (ii) one or more historical output records within the data curation sequence, and (iii) one or more items of provenance data within the data curation sequence. The one or more items of provenance data can include one or more items of span-level field information. The machine learning model can include, for example, conditional random fields. Also, in one or more embodiments of the invention, the machine learning model learns correspondences between record fields and character-level spans recorded by one or more items of provenance data.

Generating the machine learning model can include incorporating one or more statistical qualifications. The one or more statistical qualifications can include a confidence value attributed to each field of an input record and/or a confidence value attributed to each field of an output record.

Step 304 includes creating a simulated output record based at least in part on a detected anomaly corresponding to the data curation sequence. The detected anomaly can include a missing data item. Step 306 includes predicting (i) the content of one or more absent input records that precede the simulated output record in the data curation sequence and (ii) one or more items of provenance data corresponding to the simulated output record, wherein the predicting comprises applying the machine learning model to the simulated output record.

Step 308 includes outputting, to at least one user, in response to a query pertaining to the detected anomaly, (i) the content of the one or more predicted input records and (ii) at least one item of information relating the content of the one or more predicted input records to the detected anomaly. Such information can include, for example, requirements for additional handling of the predicted input records or missing relevant data from the predicted input records. Additionally, outputting can include outputting an identification of one or more problematic modules along with one or more corresponding input records to facilitate correction of the detected anomaly.

The techniques depicted in FIG. 3 can also include predicting (i) the content of a second set of one or more input records that precede the one or more predicted input records in the data curation sequence and (ii) one or more items of provenance data corresponding to the content of the one or more predicted input records, wherein the predicting comprises applying the machine learning model to the content of the one or more predicted input records. Additionally, at least one embodiment of the invention can include repeating the predicting for (i) one or more additional sets of input records and (ii) one or more additional corresponding sets of provenance data.

Also, an additional embodiment of the invention includes generating, for each of multiple stages in a data curation sequence, a machine learning model of the data curation sequence, wherein the model is based at least in part on (i) historical input records preceding the stage in question, (ii) historical output records subsequent to the stage in question, and (iii) one or more items of provenance data pertaining to the stage in question. Such an embodiment can additionally include calculating a confidence value for each field within the one or more predicted input records, repeating the predicting for (i) one or more additional sets of input records and (ii) one or more additional corresponding sets of provenance data, and outputting, to at least one user, in response to a query pertaining to the detected anomaly, (i) the content of all of the predicted input records, (ii) the calculated confidence values, and (iii) at least one item of information relating the predicted input records to the detected anomaly.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
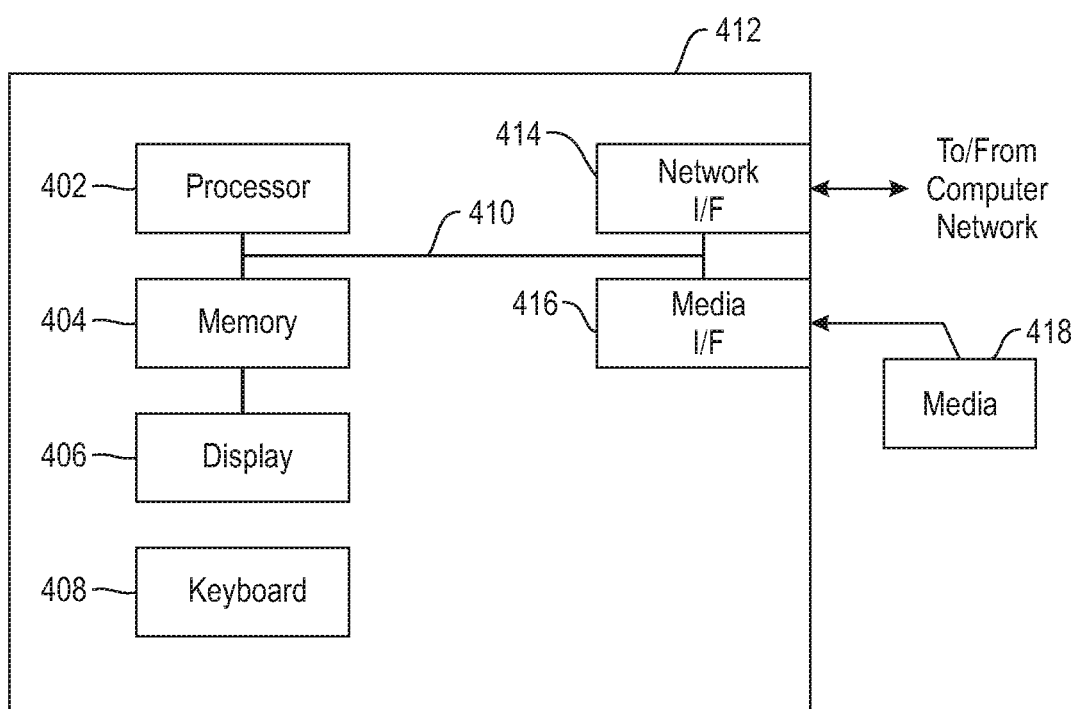
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
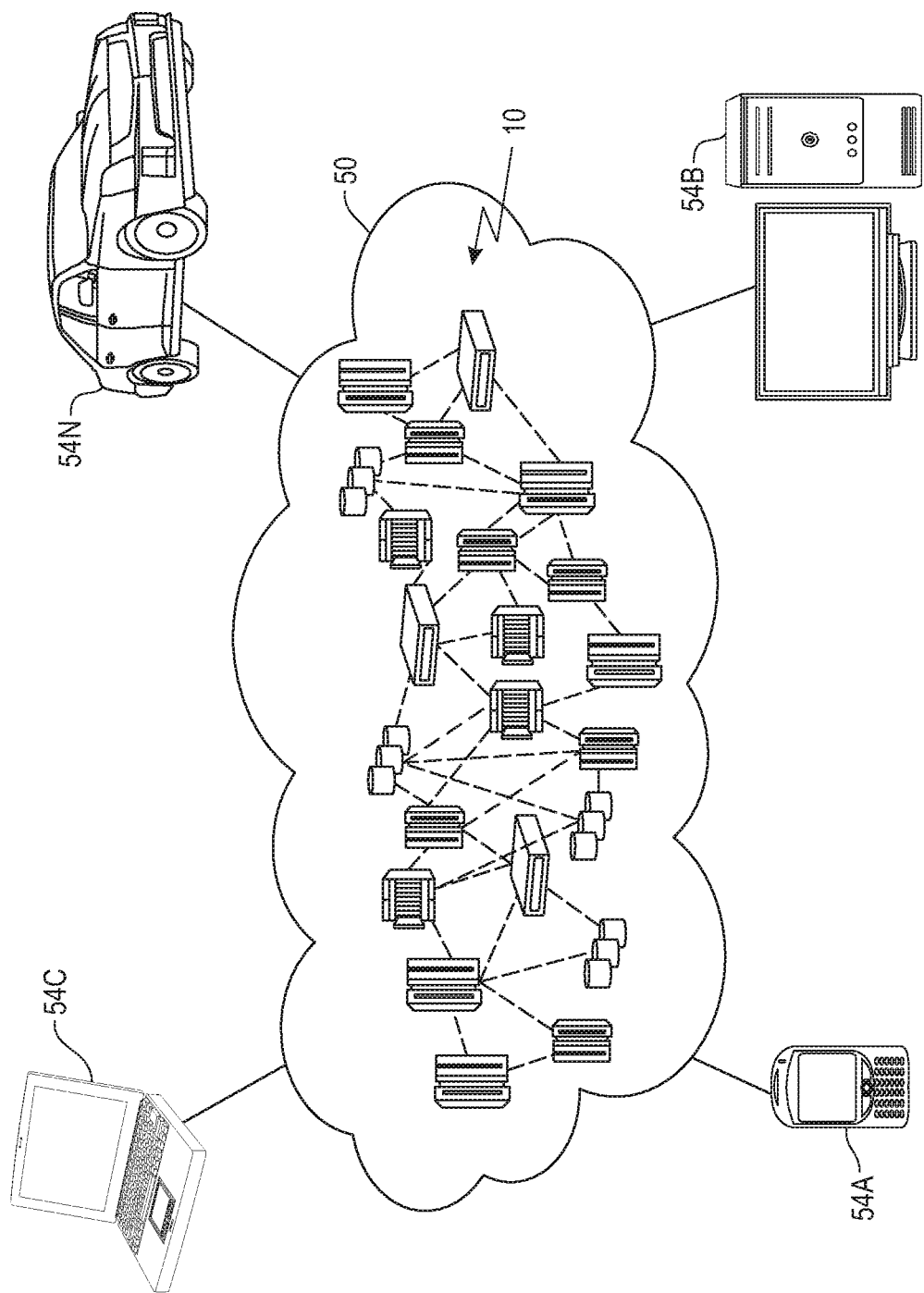
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
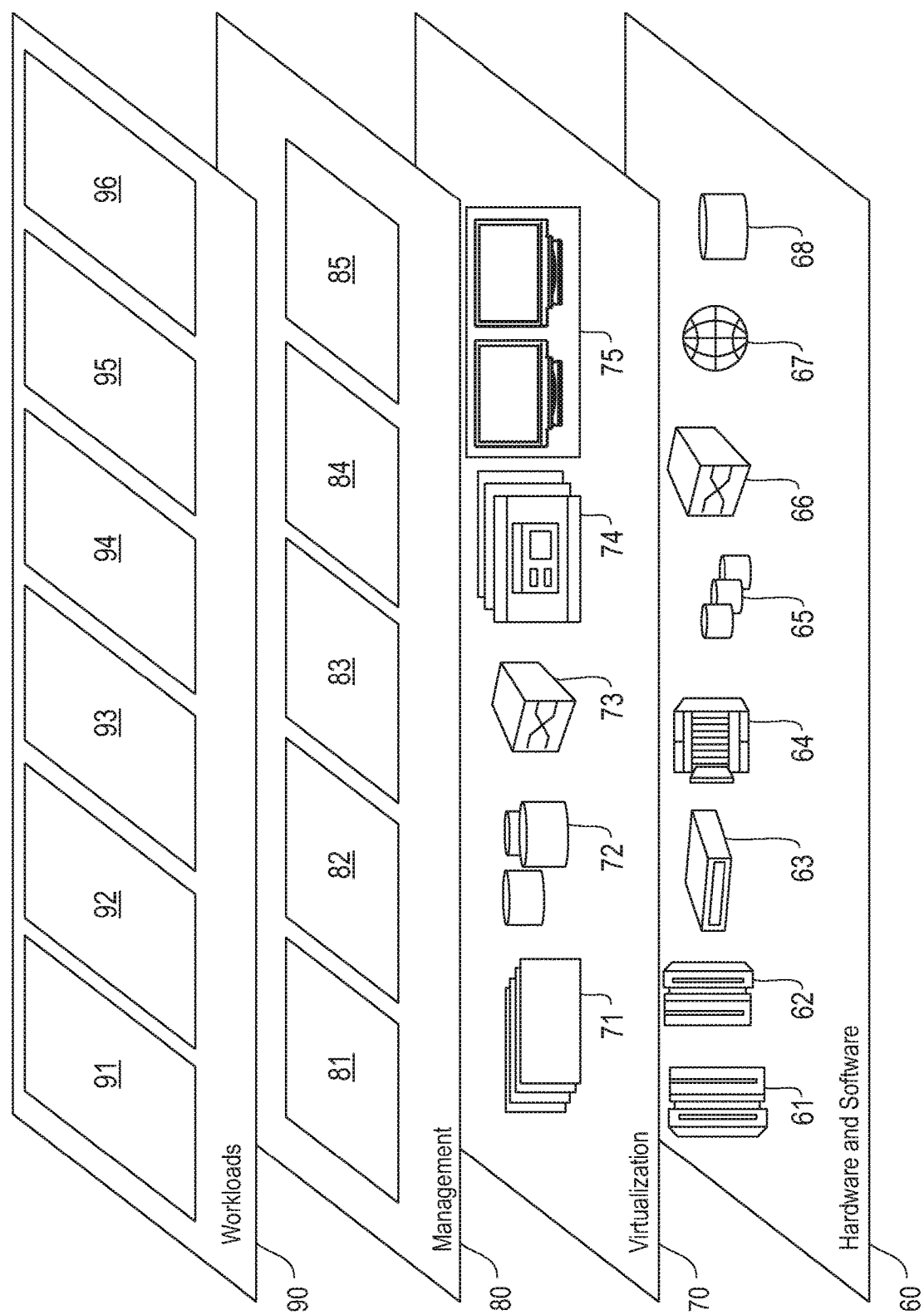
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and missing data tracking 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, creating a stage-wise model of a curation flow in the opposite direction to detect one or more failure spots, and utilizing the stage-wise modelling of the curation flow to recreate a set of input data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   generating, for each of multiple stages in a data curation sequence, a machine learning model of the data curation sequence, thereby updating the model after each subsequent stage, wherein the model is based at least in part on (i) one or more historical input records within the data curation sequence, (ii) one or more historical output records within the data curation sequence, and (iii) one or more items of provenance data within the data curation sequence;
   creating a simulated output record based at least in part on a detected anomaly corresponding to the data curation sequence;
   predicting (i) the content of one or more absent input records that precede the simulated output record in the data curation sequence and (ii) one or more items of provenance data corresponding to the simulated output record, wherein said predicting comprises applying the machine learning model to the simulated output record;
   predicting (i) the content of a second set of one or more input records that precede the one or more predicted input records in the data curation sequence and (ii) one or more items of provenance data corresponding to the content of the one or more predicted input records, wherein said predicting comprises applying the machine learning model to the content of the one or more predicted input records; and
   outputting, to at least one user, in response to a query pertaining to the detected anomaly, (i) the predicted content and (ii) at least one item of information relating the predicted content;
   wherein the method is carried out by at least one computing device.

2. The computer-implemented method of claim 1, comprising:
   repeating said predicting for (i) one or more additional sets of input records and (ii) one or more additional corresponding sets of provenance data.

3. The computer-implemented method of claim 1, wherein the machine learning model learns correspondences between record fields and character-level spans recorded by one or more items of provenance data.

4. The computer-implemented method of claim 1, wherein said generating the machine learning model comprises incorporating one or more statistical qualifications.

5. The computer-implemented method of claim 4, wherein the one or more statistical qualifications comprises a confidence value attributed to each field of an input record.

6. The computer-implemented method of claim 4, wherein the one or more statistical qualifications comprises a confidence value attributed to each field of an output record.

7. The computer-implemented method of claim 1, wherein the machine learning model comprises conditional random fields.

8. The computer-implemented method of claim 1, wherein the one or more items of provenance data comprises one or more items of span-level field information.

9. The computer-implemented method of claim 1, wherein the detected anomaly comprises a missing data item.

10. The computer-implemented method of claim 1, wherein said outputting comprises outputting an identification of one or more problematic modules along with one or more corresponding input records to facilitate correction of the detected anomaly.

11. A computer program product comprising a computer readable storage medium having program instructions embodied therewith, the program instructions executable by a computing device to cause the computing device to:
generate, for each of multiple stages in a data curation sequence, a machine learning model of the data curation sequence, thereby updating the model after each subsequent stage, wherein the model is based at least in part on (i) one or more historical input records within the data curation sequence, (ii) one or more historical output records within the data curation sequence, and (iii) one or more items of provenance data within the data curation sequence;
create a simulated output record based at least in part on a detected anomaly corresponding to the data curation sequence;
predict (i) the content of one or more absent input records that precede the simulated output record in the data curation sequence and (ii) one or more items of provenance data corresponding to the simulated output record, wherein said predicting comprises applying the machine learning model to the simulated output record;
predict (i) the content of a second set of one or more input records that precede the one or more predicted input records in the data curation sequence and (ii) one or more items of provenance data corresponding to the content of the one or more predicted input records, wherein said predicting comprises applying the machine learning model to the content of the one or more predicted input records; and
output, to at least one user, in response to a query pertaining to the detected anomaly, (i) the predicted content and (ii) at least one item of information relating the predicted content.

12. The computer program product of claim 11, wherein the program instructions executable by a computing device further cause the computing device to:
repeat said predicting for (i) one or more additional sets of input records and (ii) one or more additional corresponding sets of provenance data.

13. The computer program product of claim 11, wherein the machine learning model learns correspondences between record fields and character-level spans recorded by one or more items of provenance data.

14. The computer program product of claim 11, wherein said generating the machine learning model comprises incorporating one or more statistical qualifications.

15. A system comprising:
a memory; and
at least one processor operably coupled to the memory and configured for:
generating, for each of multiple stages in a data curation sequence, a machine learning model of the data curation sequence, thereby updating the model after each subsequent stage, wherein the model is based at least in part on (i) one or more historical input records within the data curation sequence, (ii) one or more historical output records within the data curation sequence, and (iii) one or more items of provenance data within the data curation sequence;
creating a simulated output record based at least in part on a detected anomaly corresponding to the data curation sequence;
predicting (i) the content of one or more absent input records that precede the simulated output record in the data curation sequence and (ii) one or more items of provenance data corresponding to the simulated output record, wherein said predicting comprises applying the machine learning model to the simulated output record;
predicting (i) the content of a second set of one or more input records that precede the one or more predicted input records in the data curation sequence and (ii) one or more items of provenance data corresponding to the content of the one or more predicted input records, wherein said predicting comprises applying the machine learning model to the content of the one or more predicted input records; and
outputting, to at least one user, in response to a query pertaining to the detected anomaly, (i) the predicted content and (ii) at least one item of information relating the predicted content.

16. A computer-implemented method, the method comprising:
generating, for each of multiple stages in a data curation sequence, a machine learning model of the data curation sequence, thereby updating the model after each subsequent stage, wherein the model is based at least in part on (i) historical input records preceding the stage in question, (ii) historical output records subsequent to the stage in question, and (iii) one or more items of provenance data pertaining to the stage in question;
creating a simulated output record based at least in part on a detected anomaly corresponding to the data curation sequence;
predicting (i) the content of one or more absent input records that precede the simulated output record in the data curation sequence and (ii) one or more items of provenance data corresponding to the simulated output record, wherein said predicting comprises applying the machine learning model to the simulated output record;
predicting (i) the content of a second set of one or more input records that precede the one or more predicted input records in the data curation sequence and (ii) one or more items of provenance data corresponding to the content of the one or more predicted input records, wherein said predicting comprises applying the machine learning model to the content of the one or more predicted input records;
calculating a confidence value for each field within the predicted input records;
repeating said predicting for (i) one or more additional sets of input records and (ii) one or more additional corresponding sets of provenance data; and
outputting, to at least one user, in response to a query pertaining to the detected anomaly, (i) the predicted content, (ii) the calculated confidence values, and (iii) at least one item of information relating the predicted input records to the detected anomaly;
wherein the method is carried out by at least one computing device.

17. The computer-implemented method of claim 16, wherein the machine learning model learns correspondences between record fields and character-level spans recorded by one or more items of provenance data.

18. The computer-implemented method of claim 16, wherein the one or more items of provenance data comprises one or more items of span-level field information.

\* \* \* \* \*